(12) United States Patent
Günther et al.

(10) Patent No.: US 10,288,027 B2
(45) Date of Patent: May 14, 2019

(54) FUEL-INJECTION METERING DEVICE, FUEL-INJECTION NOZZLE, MOULD FOR PRODUCING A FUEL-INJECTION METERING DEVICE AND METHOD FOR PRODUCING A FUEL-INJECTION METERING DEVICE

(71) Applicant: STOBA HOLDING GMBH & CO. KG, Backnang (DE)

(72) Inventors: Oliver Günther, Berkheim (DE); Markus Günther, Niederrieden (DE); Thomas Hög, Markt Rettenbach (DE); Hans-Joachim Konietzni, Memmingen (DE); Matthias Leichtle, Hasberg (DE); Klaus Pfendtner, Gaildorf (DE); Ulrich Wagner, Erkheim (DE)

(73) Assignee: STOBA HOLDING GMBH & CO., KG, Backnang (DE)

( * ) Notice: Subject to any disclaimer, the term of this patent is extended or adjusted under 35 U.S.C. 154(b) by 100 days.

(21) Appl. No.: 15/115,710

(22) PCT Filed: Feb. 3, 2015

(86) PCT No.: PCT/EP2015/052157
§ 371 (c)(1),
(2) Date: Aug. 1, 2016

(87) PCT Pub. No.: WO2015/114159
PCT Pub. Date: Aug. 6, 2015

(65) Prior Publication Data
US 2017/0009725 A1    Jan. 12, 2017

(30) Foreign Application Priority Data
Feb. 3, 2014    (DE) .................. 10 2014 101 308

(51) Int. Cl.
*G01M 15/04*    (2006.01)
*F02M 69/00*    (2006.01)
(Continued)

(52) U.S. Cl.
CPC ............. *F02M 69/002* (2013.01); *B23H 3/00* (2013.01); *B23H 3/04* (2013.01); *B23H 9/00* (2013.01);
(Continued)

(58) Field of Classification Search
USPC ................ 73/114.45, 114.46, 114.47, 114.48
See application file for complete search history.

(56) References Cited

U.S. PATENT DOCUMENTS

| | | | |
|---|---|---|---|
| 3,243,365 A | 3/1966 | Aikin | |
| 5,829,688 A * | 11/1998 | Rembold | B23H 9/00 239/585.1 |

(Continued)

FOREIGN PATENT DOCUMENTS

| | | |
|---|---|---|
| CN | 1226950 A | 8/1999 |
| CN | 102713245 A | 10/2012 |

(Continued)

OTHER PUBLICATIONS

Office Action from the State Intellectual Property Office of P.R. China, dated Feb. 5, 2018 in Appliclation No. 015800069476.
(Continued)

*Primary Examiner* — Eric S. McCall
(74) *Attorney, Agent, or Firm* — Eversheds Sutherland (US) LLP

(57) ABSTRACT

The present application concerns a fuel-injection metering device for a motor vehicle. The fuel-injection device include a main body with at least one through-hole, whereby the main body forms a valve seat on its inner face that is provided to interact with a valve body, whereby the inner face of the main body is electrochemically machined. The application also concerns a mold, a production method, and a fuel-injection nozzle.

7 Claims, 6 Drawing Sheets

(51) Int. Cl.
    *F02M 61/18*     (2006.01)
    *B23H 3/00*     (2006.01)
    *B23H 3/04*     (2006.01)
    *B23H 9/00*     (2006.01)
    *F02M 61/12*     (2006.01)
    *F02M 61/16*     (2006.01)
    *B23H 9/14*     (2006.01)

(52) U.S. Cl.
    CPC .......... *F02M 61/12* (2013.01); *F02M 61/168* (2013.01); *F02M 61/188* (2013.01); *F02M 61/1886* (2013.01); *B23H 9/14* (2013.01); *F02M 2200/8069* (2013.01)

(56) References Cited

U.S. PATENT DOCUMENTS

| | | | | |
|---|---|---|---|---|
| 6,155,499 | A * | 12/2000 | Rembold | B23H 9/00 |
| | | | | 239/453 |
| 6,273,346 | B1 * | 8/2001 | Estevenon | F02M 61/162 |
| | | | | 239/533.9 |
| 6,387,242 | B1 | 5/2002 | Wei et al. | |
| 6,998,187 | B2 * | 2/2006 | Finnerty | H01M 4/8621 |
| | | | | 429/486 |
| 2005/0028365 | A1 * | 2/2005 | Dantes | F02M 51/0671 |
| | | | | 29/890.122 |
| 2005/0205693 | A1 * | 9/2005 | Teschner | F02M 61/18 |
| | | | | 239/533.2 |
| 2006/0157030 | A1 | 7/2006 | Knight et al. | |
| 2006/0157594 | A1 | 7/2006 | Cooke | |
| 2008/0197215 | A1 * | 8/2008 | Ziegler | B23H 9/00 |
| | | | | 239/533.2 |
| 2009/0065957 | A1 * | 3/2009 | Mao | B01F 3/04049 |
| | | | | 261/78.1 |
| 2009/0277803 | A1 | 11/2009 | Wei et al. | |
| 2010/0183993 | A1 * | 7/2010 | McAlister | F02M 57/005 |
| | | | | 431/254 |
| 2012/0012469 | A1 | 1/2012 | Hackenberg et al. | |
| 2013/0062441 | A1 | 3/2013 | Buehner et al. | |

FOREIGN PATENT DOCUMENTS

| | | |
|---|---|---|
| DE | 1 440 997 A1 | 8/1969 |
| DE | 10 248 450 A1 | 4/2003 |
| DE | 102009000237 A1 | 7/2010 |
| WO | 9807980 | 2/1998 |
| WO | 2011082916 A1 | 7/2011 |

OTHER PUBLICATIONS

German Office Action in DE 10 2014 101 308.5 dated Sep. 22, 2014 and translation.
Office Action from German Patent and Trademark Office dated Jun. 7, 2017 in DE Application 102014101308.5, along with English translation.
Search Report, DE 18156067.3, dated Jun. 5, 2018 (4 pp.).

* cited by examiner

FUEL-INJECTION METERING DEVICE, FUEL-INJECTION NOZZLE, MOULD FOR PRODUCING A FUEL-INJECTION METERING DEVICE AND METHOD FOR PRODUCING A FUEL-INJECTION METERING DEVICE

FIELD OF THE INVENTION

The invention concerns a fuel-injection metering device for a motor vehicle such as a car, lorry or other utility vehicle which among other things comprises a cup-like main body with at least one through-hole, whereby the main body forms a valve seat on its inner face which is provided to interact with a preferably concave, round, spherical or ball-like valve body in order to seal and open the through-hole.

BACKGROUND OF THE INVENTION

In the state of the art, such as of DE 603 13 240 T2, a fuel-injection device is known for feeding pressurized fuel to a fuel injector, whereby the fuel-injection system contains the fuel injector and comprises the following: a pressure storage volume in order to feed fuel at an initial injection pressure level through a fuel feed duct to a fuel injector, a pumping agent to increase the pressure of the fuel fed to the injector to a second injection pressure level, whereby the pumping agent comprises a defined pump chamber inside a plunger bore and a plunger piston which can move inside the plunger bore so as to apply pressure to the fuel in the pump chamber. It is emphasised as being significant that there is still a valve element positioned in the fuel feed duct between the pump chamber the pressure storage volume, the valve element being capable of being switched between a first position, in which i) fuel at the first injection pressure level (P1) is fed to the injector and ii) the pump chamber is connected to the pressure storage volume so that at the first injection pressure level (P1) fuel can flow from the pressure storage volume into the pump chamber, and a second position in which the connection between the injector and the pressure storage volume is interrupted so that at the second injection pressure level (P2) fuel is fed to the injector, whereby the pumping agent continues to comprise a drive element which can be operated together with the plunger piston, whereby the drive unit is connected to a rocker arm of the machine in such a way that a movement of the drive unit causes a pivot movement of the rocker arm.

Fuel injection valves are also known from DE 60 2005 001 261 T2. Here a fuel-injection device for a combustion engine is presented, whereby the fuel-injection device also presents a coupling agent to couple the movement of an outer valve and that of an inner valve in cells in which the outer valve is moved away from the outer valve seat by an amount exceeding a predefined cell magnitude, which has the effect of causing the inner valve to be lifted away from an inner valve seat to create a third injection state in which a fuel feed is enabled equally by first and second nozzle outlets.

Methods for producing metal components are familiar from DE 10 2009 028 105 A1. Here, a generative method for producing a metal component is presented comprising the following stages: a) scanning of at least one 3D-CAD data set containing the geometry and material distribution of the component to be produced, b) selection of at least one metallic main body, c) configuration and/or removal of a local geometry on the metallic main body by means of an additive process and d) if necessary fine machining, in particular high-precision machining by means of a removal process, as well as a device for the execution of the method and a metal component in which the materials of the metallic main body and of the local geometry differ.

A fuel-injection valve is also known from DE 10 2004 015 746 T2, for example. Here a fuel-injection valve of a combustion engine is presented comprising a nozzle unit in which an outer nozzle needle interacting with at least a first injection opening and an inner nozzle needle with at least a second injection opening, the inner nozzle needle being positioned so as be able to move through the outer nozzle needle axially, and with a valve control unit which controls a fluid pressure that exists in a valve control chamber and whose level determines the position of the outer and inner nozzle needle. A pressure chamber is provided whose volume can be altered by the movement of at least one of the two nozzle needles in such a way that the pressure chamber undergoes a change in pressure and an additional force acts on at least one of the nozzle needles.

Further state of the art is familiar from DE 100 46 304 C1, DE 196 33 260 A1, DE 10 2005 049 534 A1, EP 2 018 925 A2 and DE 198 54 793.

Generic fuel-injection metering devices are familiar from diesel injection systems and from petrol injection systems, so-called "GDI systems". Such GDI systems, that is to say Gas Direct Injection systems, have to be able to handle pressures of up to 500 bar, i.e. 50 MPa. For this reason, the components of the injection system have to be adapted to the pressure load. Here it is crucial for the components produced to demonstrate good surface quality so as to reduce or ideally eliminate the risk of breakage due to stress concentration.

For this purpose lengthwise grooves, which can also be referred to as pockets, are provided in the main body, normally extending outwards radially from a main hole. Frequently five pockets are required.

Normally the main bodies of the fuel-injection metering devices are revolved inside and outside. On the inside, i.e. further defining the inner face of the main body, a milling process or other machining process is applied to create the longitudinal grooves or pockets. However, this requires lengthy processing, causes burr formation and increases costs. The burr formation also results in a poorer surface quality. This means that the parts to be produced per unit of time are more expensive, of poorer quality and limited in use.

The attempt was therefore made to create a suitable main body using other methods. As a more recent option, an MIM method is used, i.e. a metal injection moulding method. A specific configuration that lends itself here is powder injection moulding or similar injection moulding methods. Unfortunately, however, the main bodies are also subject to considerable risk of breakage in this case since the material is more brittle. The component surface can also be porous, which is likewise undesirable.

More extensive use of cold-forming methods has also been tested, whereby such processes essentially produce good results but the concentricity and position of the inner recesses and pockets is currently too imprecise, in particular in relation to the outer circumference. The inner engraving, i.e. the inner recesses or space organization of the inner recesses, is then eccentric.

However, workpiece precision is a vital property and crucial if the component is to be durable and function precisely. This is very important in terms of the reproducibility of the injection pattern from one component to another. Such reproducibility is very much desired.

SUMMARY OF THE INVENTION

It is therefore the object of the present invention to eliminate or at least reduce the disadvantages of the state of the art and provide a low-cost, high-quality and durable fuel-injection metering device that is quick to produce.

According to the invention, this object is achieved in a generic fuel-injection metering device.

An electrochemical processing method is understood to be a method also known as electrochemical machining (ECM) in the technical literature. A specific subtype of this method is also used as a deburring method. This electrochemical removal or electrochemical machining is a method of material removal particularly used for very hard, materials. It is categorized as a form of separation and is suitable for simple deburring work through to the creation of highly complex spatial forms. Electrochemical machining methods also include the familiar PECM methods (pulse electrochemical machining) or precise electrochemical machining. Now it is possible to meet high-precision requirements within the micrometer range, and microprocessing is also possible. In the case of ECM methods there is no contact between the mould and the workpiece, although insulation sections can come into contact with a workpiece, in which case there is contact between a mould and a workpiece via an insulation section. In principle, however, no mechanical forces are applied and material properties such as hardness or resilience do not impact on the process. Properties such as melting point, thermal conductivity and electrical conductivity are significant, however. Normally speaking, the workpiece is positively charged and acts as an anode, whereby the mould is negatively charged/polarized and therefore acts as a cathode.

In order to create the current required, an external voltage source is frequently used. The shape of the mould cathode frequently determines the negative shape of the machining to be applied on, in and to the workpiece. ECM is therefore a mapping process.

The process does not cause any wear and tear to the mould. There must be a gap between the mould and workpiece, depending on the electrical parameters and the flow conditions of an electrolyte. A common gap width is in the range of a few micrometers such as 0.05 mm to approx. 1 mm. The charge transport in the working gap is taken care of by an electrolyte solution such as an aqueous solution of sodium chloride (NaCl, salt solution), sodium nitrate ($NaNO_3$) or other aqueous solutions. The electron flow thereby created removes metal ions from the workpiece. The released metal ions then enter into reactions on the anode with parts of the split electrolyte. At the cathode, the electrolyte residue reacts with water. The end product is metal hydroxide, which is deposited as sludge and has to be removed.

By electrochemically machining the inner face of the main body, pockets can be applied in a defined width, depth and shape. The edges can demonstrate a defined rounding radius after processing. The rounding of the edges does not create any burr, even in the case of subsequent honing of the inner face, for example in the area of guiding surfaces for the valve body.

The invention also concerns a fuel-injection nozzle with a fuel-injection metering device configured according to the invention. Not only does the fuel-injection nozzle contain the fuel-injection metering device but there is also an axially movable valve body positioned inside it in the manner of a sphere or in the manner of a tappet with a preferably round, concave, spherical or (partially) sphere-section-like shape at the tip. If the valve body is shaped as a sphere, in one variant a valve body shape can be used instead of this with a surface that is only shaped as a sphere in sections.

The invention also concerns a mould for producing a fuel-injection metering device with an electrically chargeable cathode which is hollow at least in sections. In order to provide a highly effective mould, it is advantageous in this case if the cathode exhibits at one end an electrically insulating layer which has an electrically insulating effect or is made/structured out of electrically insulating material, through which an engagement section of the cathode protrudes. By using this mould, a fuel-injection metering device according to the invention can be produced in a low-cost, precise and fast manner.

The invention finally also concerns a method for producing a fuel-injection metering device according to the invention, whereby the inner face of an approximately cup-like main body with at least one through-hole is treated with an electrochemical machining method.

Preferred embodiments of the invention are claimed in the dependent claims and are explained below in more detail.

It is advantageous, for example, in the case of a particular embodiment of the fuel-injection metering device, for one or several longitudinal grooves on the inner face of the main body to extend in an axial direction or in any other direction such as obliquely or transversely to the axial direction, these grooves being applied by means of an electrochemical machining method. The actuation capacity of the valve body can be improved by the existence of several grooves. In this way it is possible to meet the requirements of modern combustion engines.

It is also advantageous if some 4, 5 or 6 longitudinal grooves are distributed or grouped evenly or unevenly on the inner face of the main body, separated from each other by ridges, which are preferably made of the same material as the main body, and which are rounded in the transition area to the longitudinal grooves, for example in the area of longitudinal edges. In this way, unwanted burr is avoided even in the event of subsequent honing of the inner face of the main body. The ridges improve functionality. Stability is also improved in this way.

An advantageous embodiment is also characterized in that the main body exhibits a wall which is preferably hollow-cylindrical in sections and which merges into a base at one end. In this way, the structure of the main body can be kept simple, nonetheless ensuring long-lasting operation.

For functionality it is advantageous if the base exhibits a depression on the inner face of the main body, the depression preferably exhibiting a multiple conically stepped or pan-shaped form.

It is also expedient if the longitudinal grooves extend from the end of a hollow-cylindrical wall section close to the base and through a transition section of the main body which preferably defines a conical interior contour as far as the base.

It is simple to ensure that the fuel feed can be interrupted if the through-hole is positioned in the area of the valve seat.

It is also advantageous if 4, 5, 6 or 7 through-holes are distributed around the central axis of the main body at equal angles and/or run transversely/obliquely to the central axis at the same relative angle to each other through the material of the main body. In this case, the injection pattern created by the injection of fuel is simple to determine in advance. The angular positions of the individual injection holes are not the same in some embodiments. In particular, the perpendicular angles can vary so as to selectively direct the injection jet into defined areas of the combustion chamber.

Assembly is simplified if the base comprises on its outer face a centrally positioned protrusion, preferably with a round-bodied, concave or (partially) spherical shape.

The entire fuel-injection nozzle can be improved if the valve body shaped as a sphere is materially separated from a needle which can be brought into contact with it as necessary, and if the valve body and the needle are positioned in relation to one another in such a way that the valve body can at least also be shifted in an axial direction from the needle. If the needle is now lifted by the, for example, spherically shaped valve body configuration, fluid, namely fuel, can engage with the sphere and remove it from the through-hole in the direction of the needle so that the fuel can escape through the through-hole.

Here it is particularly advantageous if the dimensions, especially the axial length of the longitudinal grooves of the main body and the exterior dimensions of the valve body, are harmonized in such a way that the fluid introduced from the end of the main body which is furthest from the through-hole, i.e. liquid fuel such as petrol or diesel, flows around the valve body and lifts it from the through-hole so as to subsequently escape through it. Of course, in the case of multiple through-holes it is conceivable that the valve body is lifted from all through-holes and the fuel then escapes through all through-holes from the fuel-injection metering device. The mould for producing the fuel-injection metering device can also be improved if on the surface of the insulation layer there is at least one, preferably radially oriented electrolyte fluid guidance groove and/or an electrolyte fluid guidance channel which runs through the material, preferably with a closed, for example circular (bored) cross-section.

Discolourations on the upper face of the workpiece, i.e. of the main body of the fuel-injection metering device, can be avoided if the electrolyte fluid guidance channel is formed from two channel sections which are oriented at right angles to one another, for example in an orthogonal manner, one of them running in an axial direction and the other in a radial direction. The channel configuration itself is advantageous in this regard. Due to the orthogonality or right-angled orientation, it is possible to keep flow resistance at a low level.

It is also advantageous if the engagement section protruding above the insulation layer is surrounded by segment-like insulation sections running in an axial direction, between which active areas of the cathode are uncovered. In this way, a removal effect can only occur in certain places and not everywhere on the hollow body.

It is also advantageous if the active areas exhibit radial outer end faces which are cathodic in effect and are electrically charged/chargeable.

If the end faces are concave or round in shape, an originally cylinder-like shape of the cathode, in particular of the engagement section, can be left unchanged when the final shape of the cathode is created by machining.

For the functioning of the mould in the method of producing the fuel-injection metering device, it is advantageous if the active areas are formed by wing-like active elements that project radially from a central body of the cathodically applicable engagement section.

Here it is expedient if the active elements are integral components of the central body or (alternatively or in addition) are connected to the main body as separate components in a positive-locking, force-fitting or firmly bonded manner. The production of such a mould can be simplified and its lifetime prolonged in this way.

It is also advantageous if the radial outer surface of the insulation sections between the active elements is flush with the end faces or shifted or raised outwardly in a radially direction.

It is advantageous if the active elements exhibit a consistent thickness in their cross-section or become thicker towards the inside of the engagement section.

The removal pattern is predictable if the thickness remains/is the same across the axial extension, in other words the active elements exhibit a consistent thickness when viewed longitudinally.

An advantageous embodiment is also characterized in that several, i.e. 4, 5, 6, 7, 8, 9 or more active elements protrude from the central body in equal distribution.

The method according to the invention can be further elaborated such that on the inner face of the main body at least one longitudinal groove is applied to the main body by means of an electrochemical (machining) method, preferably several longitudinal grooves, for example in a single work stage. In this way, electric current only has to be applied to the cathode once in order to create the entire longitudinal groove or all longitudinal grooves within a certain period of time. Here it is advantageous if a mould with a cathode is inserted in a previously applied (pocket) hole, created for example by machining such as turning or milling, from the inner face of which the through-hole extends to the outer face, and, after positioning in the (pocket) hole with the interposition of an electrolyte fluid has a removing effect (statically) on the inner face of the (pocket) hole or the cathode has a removing effect (dynamically) on the inner face of the (pocket) hole even when inserted in the main body with the interposition of an electrolyte fluid.

It is also advantageous if the electrolyte fluid is first directed through the cathode into the main body and then transported out of it, or (an even better option) if the electrolyte fluid is first directed into the main body and then transported out of it through the cathode. In the latter case in particular, the generation of heat can be kept at a low level during production, or the heat generated can be dissipated. This increases the precision of the workpiece.

It is also advantageous if the mould according to the invention is inserted in the main body, whereby the gap between the outer surface of the engagement section and the inner face of the main body is approximately a few micrometers, such as approximately 0.05 mm to 0.5 mm, or preferably approximately 0.1 mm, 0.2 mm or 0.3 mm.

Ultimately this enables static ECM processing and dynamic ECM processing. In the case of static ECM processing it is noted that the cathode stands in the workpiece (the anode). The cathode is completely insulated. It has only five more or less uncovered cathode surfaces which apply the pockets to the rotating parts. In the case of the dynamic method, the cathode is inserted at feeding speed into the pre-bored workpiece, whereby pocket contours are created during insertion. The preferred electrolyte guidance is from outside between the cathode and the anode and then out through the cathode.

A suitable material is to be selected so as to avoid power loss of the cathode and to ensure the elimination of power loss by the electrolyte/the electrolyte agent. The electrolyte flow can be reduced by adaptation/optimization of the cathode shape. This is deliberate.

Optimization of the cathode cross-section can be achieved by adaptation of the main body.

The end faces of the ridges pointing inwards can be designated as guidance surfaces, since the valve body rolls or glides along them.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

The invention is also explained in more detail as follows by means of a drawing. The drawing features different embodiments. The following are shown.

DETAILED DESCRIPTION

Figure 1:
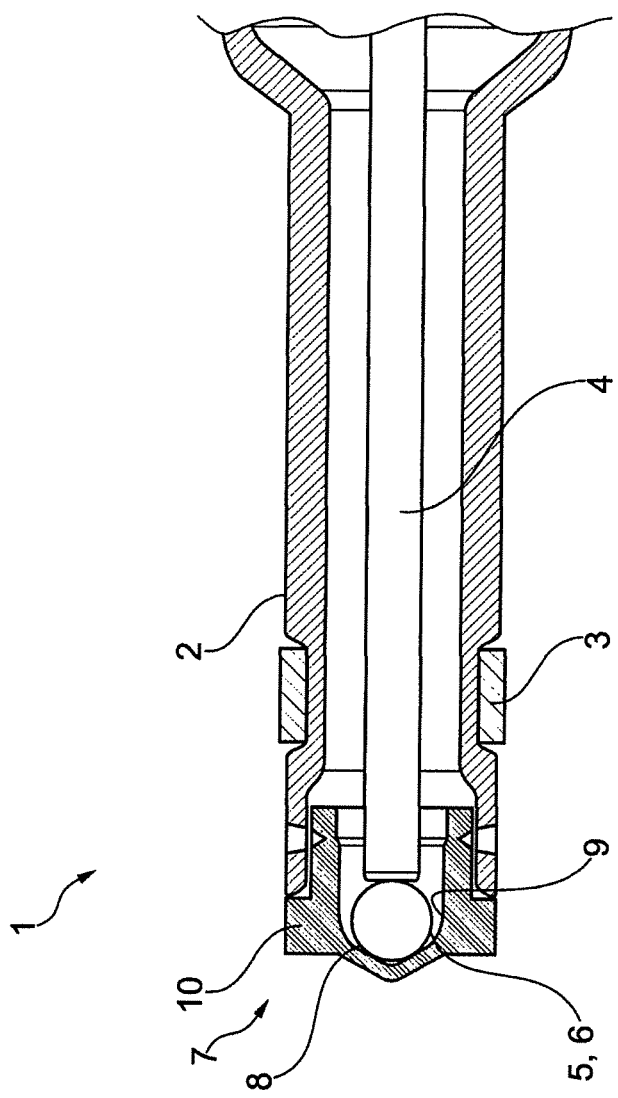
FIG. 1 shows a fuel-injection metering device according to the invention in installed state in a fuel-injection nozzle depicted in longitudinal cross-section.

The figures are diagrammatic in nature only and serve solely to explain the invention. Identical elements bear the same reference numerals. Features of the various embodiments can be interchanged. A specific feature of one embodiment can therefore be realized in another embodiment.

FIG. 1 shows a section of a fuel-injection nozzle nearest to a combustion chamber. This fuel-injection nozzle 1 can be activated by an actuator not shown which can comprise a solenoid, a magnetic cup, an overmould, connector pins, conductor barrels, support discs, O-rings, clamping sleeves, adjusting sleeves, internal poles, covers, stop rings and similar components.

The fuel-injection nozzle 1 also comprises a valve sleeve 2 on which a sealing element 3 such as a sealing ring is mounted. An activation element such as a needle 4 can be positioned inside the valve sleeve 2. The needle 4 acts as a tappet. A valve body 5 is positioned at the end of the needle 4 which is closest to the combustion power. The valve body 5 is configured as a sphere 6 or is sphere-like. The valve body 5 is positioned inside a fuel-injection metering device 7. Here, the fuel-injection metering device 7 forms a valve seat 8 on the inner face 9 of a main body 10. The main body 10 is inserted in the valve sleeve 2, preferably tightly fitted and additionally or alternatively secured in a positive-locking manner. The main body 10 can essentially be attached to the valve sleeve 2 in a firmly bonded, force-fitting or positive-locking manner.

Figure 2:
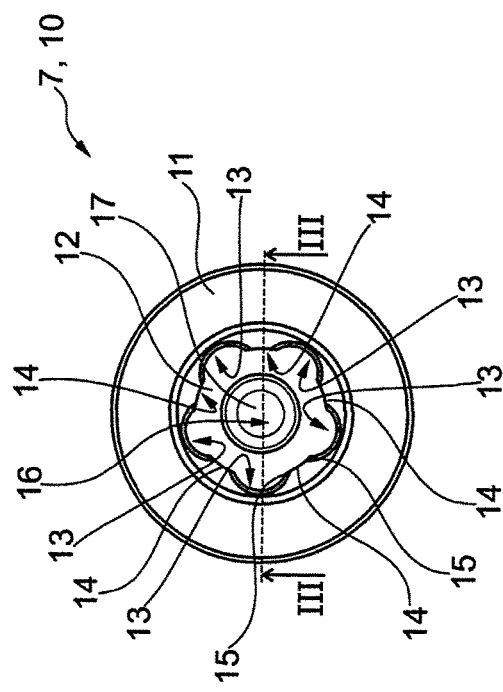
FIG. 2 shows a top view only of the fuel-injection metering device from the fuel feed side.

The main body 10 in cup-like configuration is also shown in FIG. 2 in enlarged form. It comprises a circumferential wall 11 which is closed at one end by a base 12.

Figure 3:
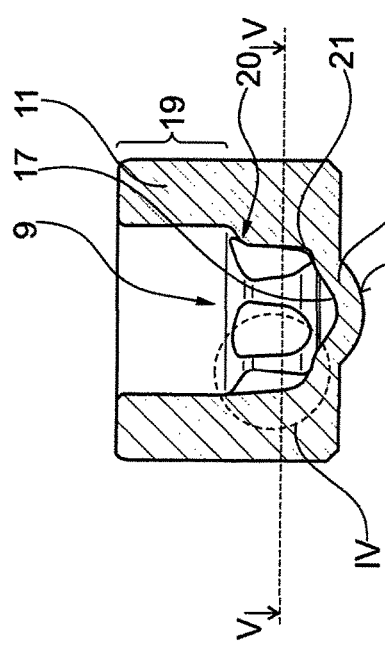
FIG. 3 shows a longitudinal section along line III from FIG. 2 through the fuel-injection metering device shown in that figure.

The integral configuration of the base 12 with the wall 11 can be clearly seen in FIG. 3.

Returning to FIG. 2, attention is drawn to five longitudinal grooves 13 which can also be designated as pockets. The longitudinal grooves 13 have a concave, evenly rounded shape. They are separated from each other by ridges 14. At each side of a ridge 14 there is an edge 15 oriented in an axial direction.

The edges 15 are blunted/rounded in configuration, in particular with a radius of 300-500 µm. Radius measurements of approximately 100 µm to 800 µm, in particular approximately 600 µm, 650 µm, 700 µm and 750 µm are especially preferable. The longitudinal grooves 13, the curvatures of the edges 15 and the shape of the recess 16 formed by them are defined or solely and/or conclusively caused by means of an electrochemical machining method.

As can also be clearly seen in FIG. 3, a central or centric depression 17 is configured. While the depression 17 is on the inner face 9, there is on the outer face, complementary to the depression 17, a protrusion 18 in the form of a dome/ball shape or a convexity/protuberance.

It can be clearly seen in FIG. 3 that the longitudinal grooves 13 do not extend over the entire length of the inner face 9. In this way, the longitudinal grooves 13 run between a hollow-cylindrical wall section 19 and a chamfered area 20 up to a transition area 21 close to the base. The relevant bevel angle for the chamfered area 20 at which the longitudinal grooves/pockets 13 are (solely) positioned is approximately 5° to 10°.

Figure 4:
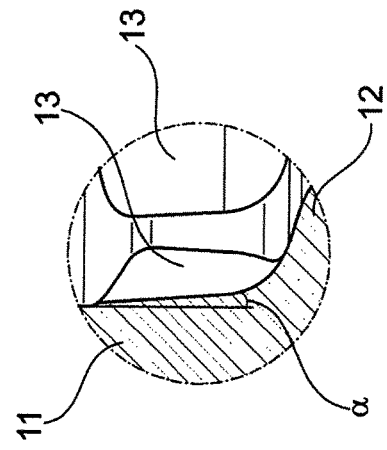
FIG. 4 shows an enlargement of the area IV from FIG. 3.
Figure 5:
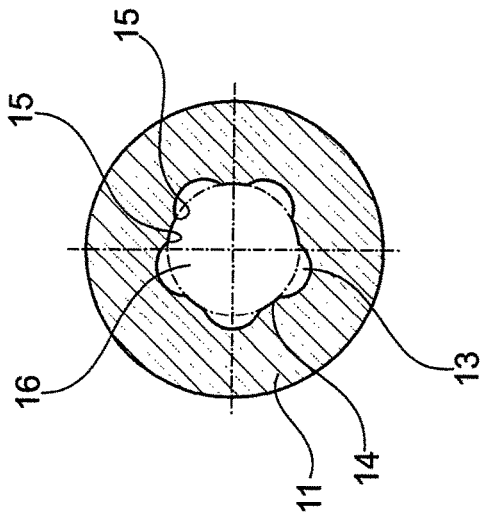
FIG. 5 shows a cross-section along line V through the fuel-injection metering device from FIG. 3, FIGS. 6a and 6b show perspective views of a mould according to the invention for producing a fuel-injection metering device according to the invention.

This angle is designated in FIG. 4 as α. FIG. 5 also clearly shows the regular alternation between ridges 14 and longitudinal grooves 13 as well as the roundness of the edges/longitudinal edges 15 in the area of the ridges 14.

Figure 6A:
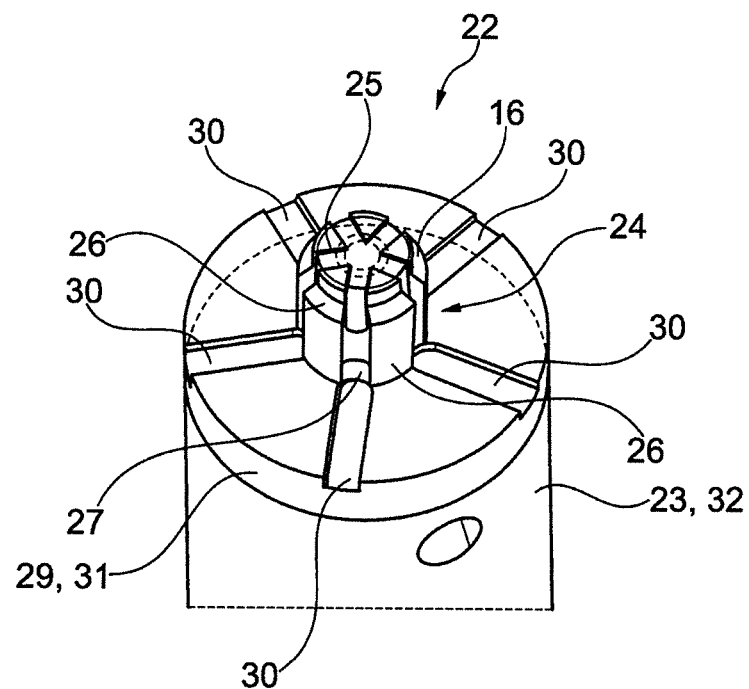
Figure 6B:
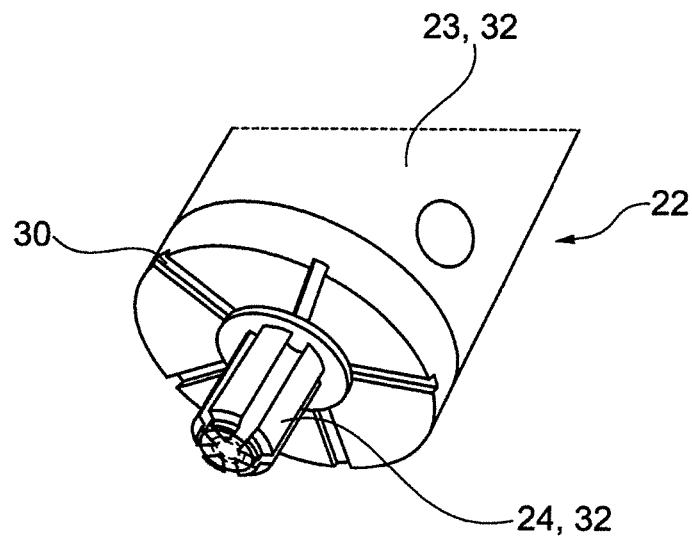

FIGS. 6a and 6b show the tip of a mould 22 according to the invention. The mould 22 exhibits a basic body 23, for example made of brass. Towards its tip, i.e. for the purpose of protrusion into the main body 10 when inserted into the later, the basic body 23 has a reduced diameter and is designated at this point as the engagement section 24. The engagement section 24 exhibits a hollow core 25 made of the same material as the basic body 23, which is preferably brass. On the outer face, the engagement section 24 is surrounded by segment-like insulation sections 26. The segment-like insulation sections 26 are chamfered or flattened towards the distal end of the engagement section 24. A radial outer end face 27 of active elements 28 protruding from the core 25 moves to the surface between the segment-like engagement sections 26. Leading away from the end faces 27 in a radial direction, electrolyte fluid guidance grooves 30 are provided in a ring 29. The ring 29 is structured out of insulating material, thereby acting as an insulation layer 31. The ring 29 is at the end of the larger diameter of the basic body 23 that serves as a cathode. The basic body 23, which ultimately forms the core 25 of the engagement section 24, is electrically chargeable and as such acts as a cathode 32.

This cathode 32 is also shown in FIG. 6b.

Figure 7:
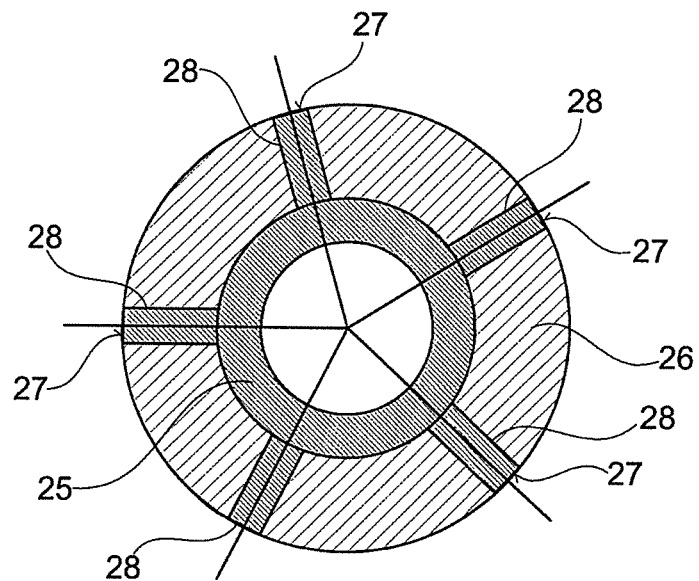
FIG. 7 shows a cross-section through an engagement section of a mould configuration of FIGS. 6a and 6b acting as a cathode.

FIG. 7 shows a cross-section of an engagement section 24. Here, the active elements 28 protrude like wings from a tube-like configuration of the core 25. The core 25 in this case has a wall thickness which is relatively thin, for example between 0.2 and 0.3 mm. The integral active elements 28 then transport electric current to their end faces 27, whereby the current occurring at the end faces 27 results in removal of material on the inner face 9 of the main body 10, when the cathode 32 is inside or is inserted in the recess/(pocket) hole 16. The insulation sections 26 are then always positioned between two integral active elements connected with the core 25.

Figure 8:
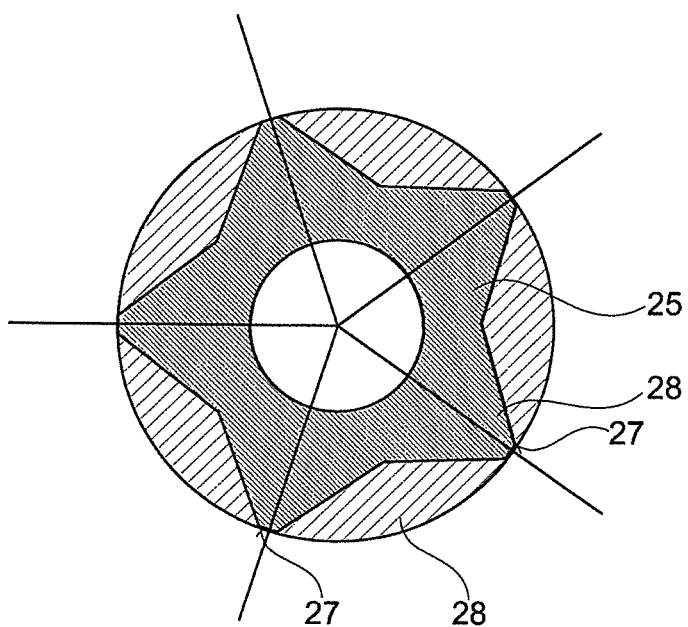
FIG. 8 shows a variant of the embodiment from FIG. 7 of an engagement section of a mould configuration acting as a cathode.

This is also the case in the embodiment shown in FIG. 8, although in this case the shape of the wings/active elements 28 differs from the embodiment shown in FIG. 7. The cross-section of the core 25 with active elements 28 is more star-shaped/poinsettia-like in this case, such that the active elements 28 widen in the direction of the core 25.

Figure 9:
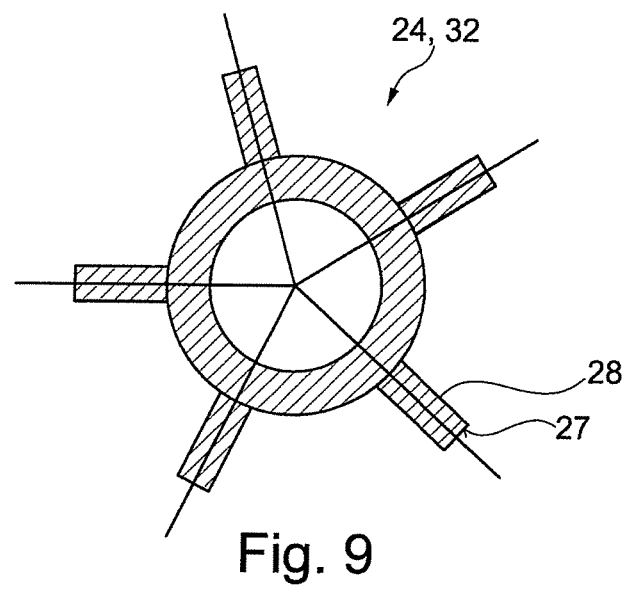
FIG. 9 shows the engagement section from FIG. 7 without insulating segments on the outer face between wing-like active elements.
Figure 10:
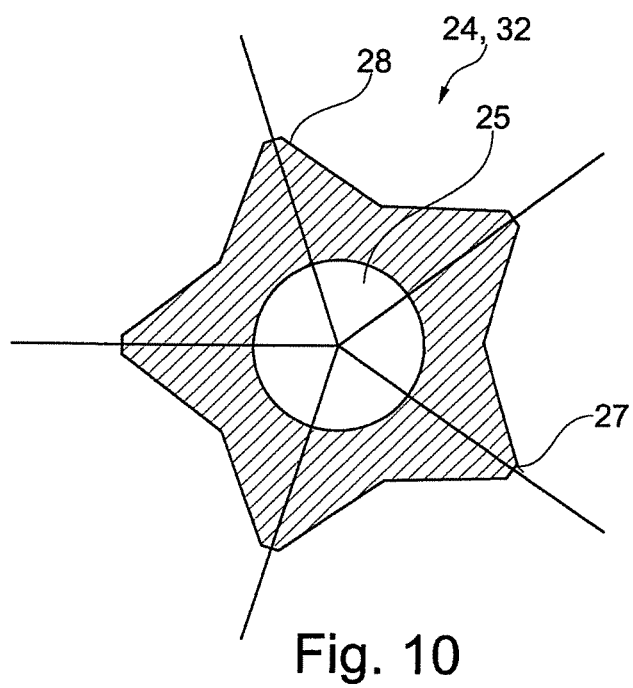
FIG. 10 shows the engagement section from FIG. 8 without insulating segments, similar to the depiction in FIG. 9.

FIGS. 9 and 10 show the cathode materials of the engagement sections 24 in cross section. Inside the cathode 32 during operation, an electrolyte fluid flows either into the main body 10 of the fuel-injection metering device 7 or out of it. This can be seen especially clearly in FIGS. 11 and 12. The electrolyte flow is indicated by means of arrows 33. In the embodiments shown in FIGS. 11 and 12, electrolyte fluid flows through the interior of the cathode 32 into the interior of the main body 10 and then either (see FIG. 11) out through an electrolyte fluid groove 30 or out through an electrolyte fluid channel 34 (see FIG. 12). However, it is much more advantageous if the direction of fluid flow is reversed.

Figure 11:
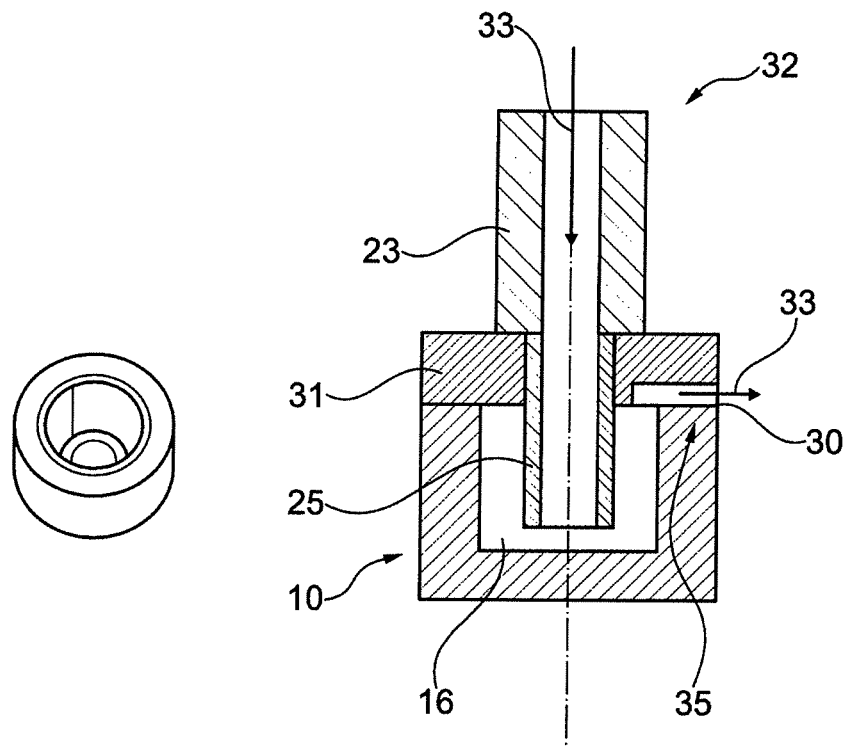
FIG. 11 shows an initial depiction of a method for producing a fuel-injection metering device.
Figure 12:
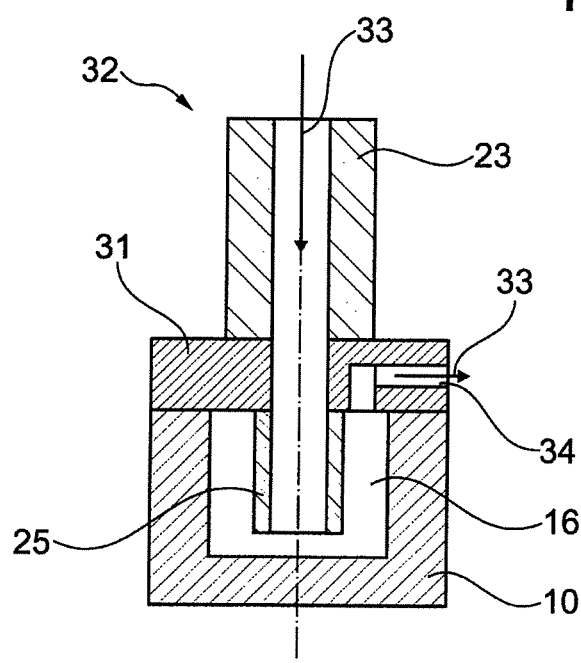
FIG. 12 shows a variant of a method for producing a fuel-injection metering device.

In the embodiment according to FIG. 11, a discolouration on the surface of the main body 10 facing the insulation layer 31 is shown in position 35.

It should be apparent that the foregoing relates only to the preferred embodiments of the present application and the resultant patent.

Numerous changes and modification may be made herein by one of ordinary skill in the art without departing from the general spirit and scope of the invention as defined by the following claims and the equivalents thereof.

LIST OF REFERENCE NUMERALS

1 Fuel-injection nozzle
2 Valve sleeve
3 Sealing element
4 Needle
5 Valve body
6 Sphere
7 Fuel-injection metering device
8 Valve seat
9 Inner face
10 Main body
11 Wall
12 Base
13 Longitudinal groove/pocket
14 Ridge
15 Edge/longitudinal edge
16 Recess/(pocket) hole
17 Depression
18 Protrusion
19 Hollow-cylindrical wall section
20 Chamfered area
21 Transition area
22 Mould
23 Basic body
24 Engagement section
25 Core
26 Segment-like insulation section
27 End face
28 Active element
29 Ring
30 Electrolyte fluid groove
31 Insulation layer
32 Cathode
33 Electrolyte fluid flow
34 Electrolyte fluid channel
35 Discolouration

We claim:

1. A fuel-injection metering device for a motor vehicle which comprises a valve sleeve and a main body with at least one through-hole,
   whereby the main body forms a valve seat on its inner face which is provided to interact with a valve body in order to seal and open the through-hole, and
   whereby several longitudinal grooves extending in an axial direction are provided on the inner face of the main body wherein the longitudinal grooves are separated by ridges, and
   wherein the inner face of the main body is electrochemically machined,
   characterized in that
   the ridges are rounded in the transition area to the longitudinal grooves and the transition area is electrochemically machined,
   wherein the longitudinal grooves run between a hollow-cylindrical wall section and a transition area close to a base in a chamfered area,
   wherein the relevant bevel angle for the chamfered area at which the longitudinal grooves are positioned is between 5° to 10°.

2. The fuel injection metering device according to claim 1, characterized in that one or more longitudinal grooves extending in the axial direction are electrochemically machined into the inner face of the main body.

3. A fuel-injection nozzle with a fuel-injection metering device according to claim 1, and a valve body which is axially movable inside of the fuel-injection nozzle, wherein the valve body is in the manner of a sphere or in the manner of a tappet with a round, concave, spherical or sphere-section-like shape at the tip.

4. The fuel-injection nozzle according to claim 3, characterized in that the main body of the fuel-injection metering device and the end of the valve sleeve are firmly bonded, positive-locking or force-fitted.

5. The fuel-injection nozzle according to claim 3, characterized in that the valve body shaped as a sphere is of a separate material from a needle which is brought into contact with the valve body in a first state, and the valve body and the needle are positioned in relation to one another in such a way that the valve body is shifted in an axial direction from the needle in a second state.

6. A method for producing a fuel-injection metering device according to claim 1,
   whereby the inner face of a main body with at least one through-hole is treated by means of an electrochemical machining method and on the inner face of the main body, several longitudinal grooves are provided which extend in an axial direction and are separated from one another by ridges,
the ridges being electrochemically rounded in the transition area to the longitudinal grooves.

7. The method according to claim 6, characterized in that at least one longitudinal groove is applied on the inner face of the main body by means of an electrochemical machining method.

* * * * *